D. E. FIELD.
Corn Sheller.

No. 99,768. Patented Feb. 15, 1870.

WITNESSES,
Chas H Smith
Geo. T Pinchney

Daniel E Field
per Lemuel W Serrell
Atty.

United States Patent Office.

DANIEL E. FIELD, OF LEAKSVILLE, NORTH CAROLINA, ASSIGNOR TO HIMSELF AND COLLETT LEVENTHORPE, OF NEW YORK CITY.

Letters Patent No. 99,768, dated February 15, 1870.

IMPROVEMENT IN CORN-SHELLERS.

The Schedule referred to in these Letters Patent and making part of the same.

*To all whom it may concern:*

Be it known that I, DANIEL E. FIELD, of Leaksville, in the county of Rockingham, and State of North Carolina, have invented certain new and useful Improvements in Corn-Shellers; and I do hereby declare that the following is a full, clear, and exact description thereof, reference being had to the annexed drawing making part of this specification.

Figure 1:
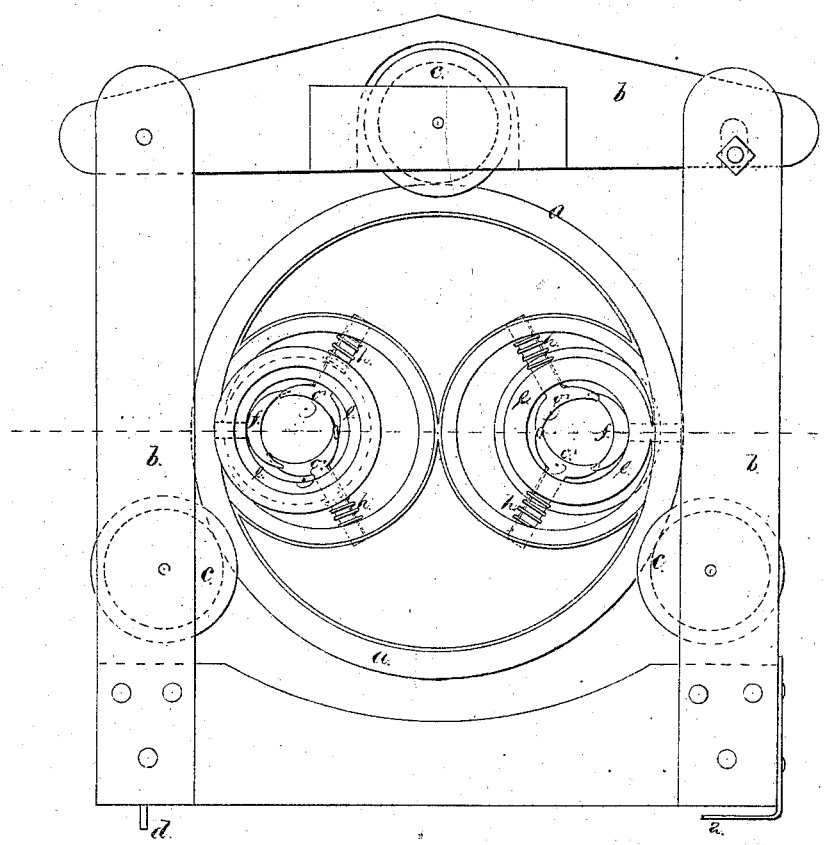
Figure 1 represents a side view of my improved corn-sheller.
Figure 2:
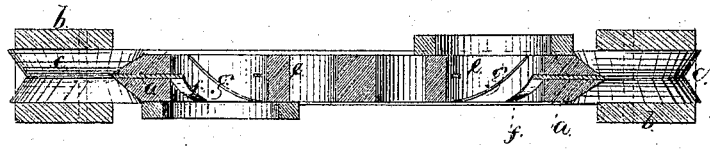
Figure 2 is a horizontal section.

The nature of the invention consists in constructing a corn-sheller so as to enable the operator to shell two ears of the corn at the same time, by the employment of the two ears in the first, and the two cobs in the latter stage of the operation, in the place of handles to rotate the shelling-mechanism, thus dispensing with gearing. It follows that the machine can shell one ear instead of two, if necessary.

My improved corn-sheller consists of a wheel, $a$, steadied in the frame $b$ by the three grooved friction-wheels, $c\ c\ c$. The frame $b$ is made adjustable, so as to be changed easily when the friction-wheels $c\ c\ c$ become worn.

The machine being fastened in an upright position by the hook 2 and pin $d$, or any other contrivance on the base of frame $b$, the two rings, $e\ e$, within the wheel $a$, receive the tops of the two ears of corn, which are introduced simultaneously on the right and on the left side by the right and left hands of the operator.

The tops of the two ears thus introduced are received within the openings through the rings $e\ e$, and said rings are supplied with one or more stationary teeth or strippers, $f\ f\ f\ f$, and one or more movable teeth, $g\ g\ g\ g$, governed by the spiral springs $h\ h\ h\ h$.

The two ears of corn thus become the handles with which to turn the wheel $a$. The cobs pass through the rings $e$ as the shelling proceeds, and when of sufficient length are seized in their turn by shifting the hands, and used as handles until the operation is complete.

The stationary and movable teeth are set at such an angle or inclination that their points lie in the proper direction to draw the unshelled ears of corn into, and the nude cobs through the rings $e\ e$, as the wheel $a$ is revolved on its axis.

What I claim, and desire to secure by Letters Patent, is—

The combination of the wheel $a$ and the two rings $e\ e$, containing the fixed and movable teeth $f\ f\ f\ f$ and $g\ g$, arranged and operated as described, for the purposes set forth.

In witness whereof, I have hereunto set my signature, this 4th day of December, in the year of our Lord, 1869, and of the independence of the United States of America the ninety-third.

D. E. FIELD.

Witnesses:
JONES W. BURTON,
J. B. GUERRANT.